US011475350B2

(12) United States Patent
McMahan et al.

(10) Patent No.: US 11,475,350 B2
(45) Date of Patent: Oct. 18, 2022

(54) TRAINING USER-LEVEL DIFFERENTIALLY PRIVATE MACHINE-LEARNED MODELS

(71) Applicant: Google LLC, Mountain View, CA (US)

(72) Inventors: Hugh Brendan McMahan, Seattle, WA (US); Kunal Talwar, Sunnyvale, CA (US); Li Zhang, Sunnyvale, CA (US); Daniel Ramage, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 1281 days.

(21) Appl. No.: 15/877,196

(22) Filed: Jan. 22, 2018

(65) Prior Publication Data

US 2019/0227980 A1  Jul. 25, 2019

(51) Int. Cl.
| | |
|---|---|
| G06F 9/44 | (2018.01) |
| G06N 20/00 | (2019.01) |
| G06K 9/62 | (2022.01) |
| G06F 8/65 | (2018.01) |
| H04L 67/10 | (2022.01) |
| G06F 21/62 | (2013.01) |
| H04L 9/40 | (2022.01) |

(52) U.S. Cl.
CPC ............ *G06N 20/00* (2019.01); *G06F 8/65* (2013.01); *G06F 21/6245* (2013.01); *G06K 9/6256* (2013.01); *H04L 63/00* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,698,250 B2 * | 4/2010 | Dwork | G06F 21/6245 707/687 |
| 2014/0019934 A1 * | 1/2014 | Schlarb | G06F 8/72 717/104 |

(Continued)

OTHER PUBLICATIONS

Martin Abadi et al., "Deep Learning with Differential Privacy", Oct. 2016 (Year: 2016).*

(Continued)

*Primary Examiner* — Wei Y Zhen
*Assistant Examiner* — Lanny N Ung
(74) *Attorney, Agent, or Firm* — Dority & Manning, P.A.

(57) ABSTRACT

Systems and methods for learning differentially private machine-learned models are provided. A computing system can include one or more server computing devices comprising one or more processors and one or more non-transitory computer-readable media that collectively store instructions that, when executed by the one or more processors cause the one or more server computing devices to perform operations. The operations can include selecting a subset of client computing devices from a pool of available client computing devices; providing a machine-learned model to the selected client computing devices; receiving, from each selected client computing device, a local update for the machine-learned model; determining a differentially private aggregate of the local updates; and determining an updated machine-learned model based at least in part on the data-weighted average of the local updates.

20 Claims, 5 Drawing Sheets

(56) References Cited

U.S. PATENT DOCUMENTS

| | | | | |
|---|---|---|---|---|
| 2015/0242760 | A1* | 8/2015 | Miao | H04L 67/42 |
| | | | | 706/12 |
| 2018/0018590 | A1* | 1/2018 | Szeto | G06F 21/6254 |
| 2018/0255023 | A1* | 9/2018 | Whaley | G06N 20/00 |

OTHER PUBLICATIONS

Robin C. Geyer et al. ,"Semi-Supervised Knowledge Transfer for Deep Learning from Private Training Data", Mar. 2017 (Year: 2017).*

Abadi et al., "Deep Learning with Differential Privacy", 23$^{rd}$ ACM Conference on Computer and Communications Security, Vienna, Austria, Oct. 24-28, 2016, pp. 308-318.

Abadi et al., "Source Code for 'Deep Learning with Differential Privacy'", Sep. 21, 2017, https://qithub.com/tensorflow/models/tree/master/differential_privacy, retrieved on Jan. 22, 2018, 1 page.

Al-Rfou et al., "Conversational Contextual Cues: The Case of Personalization and History for Response Ranking", arXiv:1606.00372v1, Jun. 1, 2016, 10 pages.

Bassily et al., "Practical Locally Private Heavy Hitters", arXiv:1707.04982v1, Jul. 17, 2017, 32 pages.

Bassily et al., "Private Empirical Risk Minimization: Efficient Algorithms and Tight Error Bounds", arXiv:1405.7085v2, Oct. 17, 2014, 39 pages.

Chaudhuri et al., "Differentally Private Empirical Risk Minimization", Journal of Machine Learning Research., vol. 12, Feb. 1, 2011, pp. 1069-1109.

Dwork, "A Firm Foundation for Private Data Analysis". Communications of the ACM, vol. 54, No. 1, Jan. 2011, pp. 86-95.

Dwork et al., "Differential Privacy and Robust Statistics", Forty-first ACM Symposium on Theory of Computing, Bethesda, Maryland, May 31-Jun. 2, 2009, pp. 371-380.

Dwork et al., "The Algorithmic Foundations of Differential Privacy", Foundations and Trends in Theoretical Computer Science, vol. 9, Nos. 3-4, 2014, pp. 211-407.

Dwork et al., "Calibrating Noise to Sensitivity in Private Data Analysis", Theory of Cryptography Conference, New York, New York, Mar. 4-7, 2006, pp. 265-284.

Gal et al., "A Theoretically Grounded Application of Dropout in Recurrent Neural Networks", Advances in Neural Information Processing Systems, Barcelona, Spain, Dec. 5-10, 2016, pp. 1019-1027.

Grave et al., "Improving Neural Language Models with a Continuous Cache", arXiv:1612.04426v1, Dec. 13, 2016, 9 pages.

Hochreiter et al., "Lone Short-Term Memory", Neural Computation, vol. 9. Issue 8, Nov. 15, 1997, pp. 1735-1780.

Kasiviswanathan et al., "What Can We Learn Privately", SIAM Journal on Computing, vol. 40, Issue 3, May 2011, pp. 793-826.

McMahan et al., "Federated Learning of Deep Networks Using Model Averaging", arXiv:1602.05629v1, Feb. 17, 2016, 11 pages.

McSherry et al., "Differentially Private Recommender Systems: Building Privacy into the Netflix Prize Contenders", 15$^{th}$ ACM International Conference on Knowledge Discovery and Data Mining, Paris, France, Jun. 28-Jul. 1, 2009, pp. 627-636.

Merity et al., "Pointer Sentinel Mixture Models", arXiv:1609.07843v1, Sep. 26, 2016, 13 pages.

Papernot et al., "Semi-Supervised Knowledge Transfer for Deep Learning from Private Training Data", Proceeding's of the International Conference on Learning Representations, Toulon, France, Apr. 24-26, 2017, 16 pages.

Shokri et al., "Privacy-Preserving Deep Learning" 22$^{nd}$ Conference on Computing and Communications Security, Denver Colorado, Oct. 12-16, 2015, pp. 1310-1321.

Shokri et al., "Membership Inference Attacks Against Machine Learning Models", Symposium on Security and Privacy, San Jose, California, May 22-26, 2017, 16 pages.

Song et al., "Stochastic Gradient Descent with Differentially Private Updates", Global Conference on Signal and Information Processing, Austin, Texas, Dec. 3-5, 2013, 4 pages.

Sundermeyer et al., "LSTM Neural Networks for Language Modeling", Interspeech, 2012, pp. 194-197.

Wu et al., "Bolt-on Differential Privacy for Scalable Stochastic Gradient Descent-Based Analytics", Proceedings of 2017 International Conference on Management of Data, Chicago, Illinois, May 14-19, 2017, pp. 1307-1322.

Zhang et al., "Understanding Deep Learning Requires Rethinking Generalization", arXiv:1611.03530v2, Feb. 26, 2017, 15 pages.

Zinkevich, "Online Convex Programming and Generalized Infinitesimal Gradient Ascent", International Conference on Machine Learning, Washington, DC, Aug. 21-24, 2003, 28 pages.

* cited by examiner

TRAINING USER-LEVEL DIFFERENTIALLY PRIVATE MACHINE-LEARNED MODELS

FIELD

The present disclosure relates generally to machine learning. More particularly, the present disclosure relates to training user-level differentially private machine-learned models.

BACKGROUND

As machine-learned models have become increasingly complex and suited to particular tasks, training such models with datasets indicative of actual usage has enabled more accurate models to be developed. For example, a next-word prediction model for a mobile keyboard may achieve increased accuracy when trained by datasets including actual user inputs on users' mobile devices rather than publicly available data, such as data from public websites. However, in some implementations, datasets indicative of actual usage may include private information associated with an individual user, such as the user's name, passwords, search histories, or other privacy sensitive information. Existing machine learning algorithms have been unable to achieve equivalent model accuracy while protecting the privacy of an individual user's information.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include one or more server computing devices. The one or more server computing devices can include one or more processors and one or more non-transitory computer-readable media that collectively store instructions that, when executed by the one or more processors cause the one or more server computing devices to perform operations. The operations can include selecting a subset of client computing devices from a pool of available client computing devices. The operations can further include providing a machine-learned model to the selected client computing devices. The operations can further include receiving, from each selected client computing device, a local update for the machine-learned model. The operations can further include determining a differentially private aggregate of the local updates. The operations can further include determining an updated machine-learned model based at least in part on the differentially private aggregate of the local updates.

Another example aspect of the present disclosure is directed to a computer-implemented method for differentially private machine learning. The method can include selecting, by one or more server computing devices, a subset of client computing devices from a pool of available client computing devices. The method can further include providing, by the one or more server computing devices to the selected client computing devices, a machine-learned model. The method can further include determining, by each selected client computing device, a local update based at least in part on a local dataset. The method can further include providing, by each selected client computing device, the local update to the one or more server computing devices. The method can further include determining, by the one or more server devices, a bounded-sensitivity data-weighted average of the local updates. The method can further include determining, by the one or more server computing devices, an updated machine-learned model based at least in part on the bounded-sensitivity data-weighted average of the local updates.

Another example aspect of the present disclosure is directed to one or more server computing devices. The one or more server computing devices can be configured to perform operations. The operations can include selecting a subset of client computing devices from a pool of available client computing devices. The operations can further include providing a machine-learned model to the selected client computing devices. The operations can further include receiving, from each selected client computing device, a local update for the machine-learned model. The operations can further include determining an updated machine-learned model based at least in part on the local updates. The updated machine-learned model can be subject to a user-adjacent differential privacy guarantee.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

1. Overview

Figure 1:
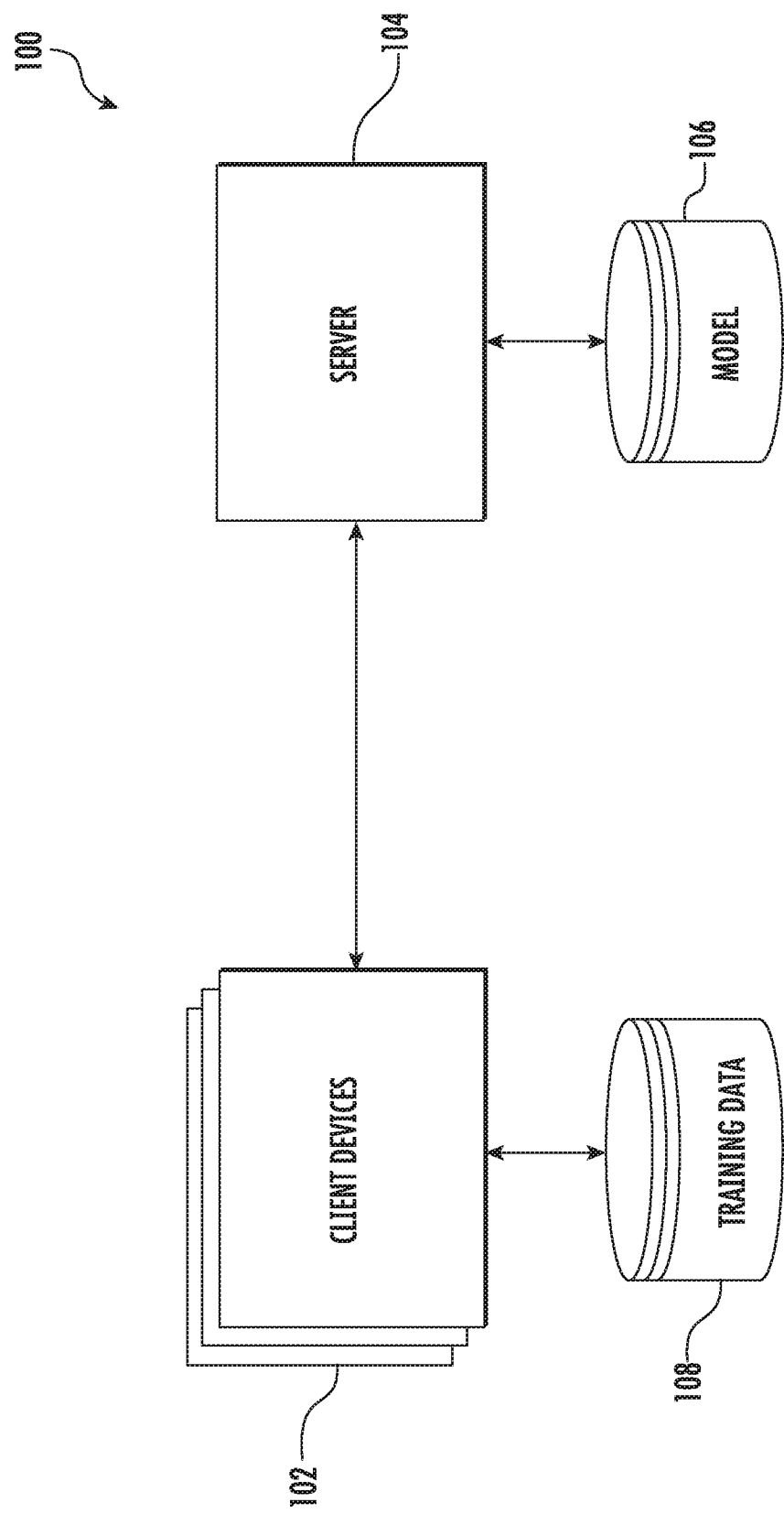
FIG. 1 depicts a block diagram of an example computing system according to example aspects of the present disclosure.

Example aspects of the present disclosure are directed to systems and methods for maintaining differential privacy in a machine-learning framework. For example, the systems and methods of the present disclosure can allow for a local dataset, such as a dataset of a single user stored on a user's device, to be used to train a machine-learned model while protecting the privacy of the user's data in the training dataset. For example, in some implementations, the machine-learning techniques provided herein can be implemented within the context of a federated learning framework while providing a user-level differential privacy guarantee. However, the systems and methods of the present disclosure can be implemented in other machine-learning frameworks as well.

More particularly, federated learning is a machine learning framework that enables training of a high-quality centralized model based on training data distributed over a large number of client computing devices. Federated learning may also be referred to as "federated optimization" in certain instances.

In federated learning, the training data can be kept locally on users' mobile computing devices (also referred to as "client computing devices") and such client computing devices can be used as nodes for performing computation on their local data in order to update a global model. Thus, the federated learning framework differs from conventional distributed machine learning due to the large number of clients, data that is highly unbalanced and not independent and identically distributed ("i.i.d."), and subject to potentially unreliable network connections.

Federated learning offers several distinct advantages compared to performing learning at a centralized server. For example, information of the model update may be less sensitive than the data itself. Thus, user data that is privacy sensitive can remain at the user's computing device and need not be uploaded to the server. Rather, only the less sensitive model update can be transmitted. As another advantage, federated learning leverages the computational power of a large number of computing devices (e.g., user mobile devices). In addition, in some implementations, the federated learning framework can be modified to allow for the creation and use of personalized models for each user at their respective device.

However, while the federated learning framework allows user-level data to be maintained on the user's device, in some situations, such user-level data may nonetheless be particularly and uniquely privacy sensitive. For example, a local dataset which includes text typed on a user's computing device (e.g., a mobile phone) may include passwords, text messages, and search queries. Thus, such a local dataset may be capable of identifying a particular user, such as explicitly by name or implicitly by a unique or rare phrase, and could possibly link that user to secret or sensitive information.

The systems and methods according to example aspects of the present disclosure can allow for a differential privacy guarantee to be provided to such users. In a machine-learning framework, differential privacy allows for a public release of a machine-learned model with a guarantee that adversaries are severely limited in what they can learn about the original training data based on analyzing the machine-learned model's parameters, even when such adversaries have access to arbitrary side information.

In some implementations, systems implementing machine learning subject to a differential privacy guarantee can perform the one or more of the following actions in each of a plurality of rounds of model optimization: one or more server computing devices can select a subset of client computing devices from a pool of available client computing devices; a machine-learned model can be provided to the selected client computing devices; each selected client computing device can determine a local update based at least in part on a local dataset; the local updates can be provided by the selected client computing devices to the one or more server computing devices; the one or more server computing devices can determine a bounded-sensitivity data-weighted average of the local updates; and an updated machine-learned model can be determined based at least in part on the bounded-sensitivity data-weighted average of the local updates. Performing a plurality of rounds of the above actions iteratively can improve the machine-learned model based on training data stored at the client devices, while providing a user-level differential privacy guarantee.

For example, the one or more server computing devices can select a subset of available client computing devices. In some implementations, the available client computing devices can be client computing devices which are powered on, plugged into a power source, and/or in an idle mode. In some implementations, the subset of client computing devices can be random-sized. For example, the one or more server computing devices can select the subset of client computing devices from the pool of available computing devices by selecting each selected client computing device independently from the pool of available devices based at least in part on a probability parameter. For example, during each round of model optimization, a random-sized batch of client computing devices can be independently selected with a probability q, rather than selecting a fixed number of users. In some implementations, the random-sized subset can be bounded, such as, for example, by upper and lower bounds, but can be any number within the bounds. In this way, an expected number of selected client computing devices can be determined, while still providing a random-sized subset of selected client computing devices.

A machine-learned model can then be provided to the selected client computing devices. For example, one or more server computing devices can provide a global set of parameters for a machine-learned model to each selected client computing device.

In some implementations, after receiving the machine-learned model, each selected client computing device can then determine a local update based at least in part on a local dataset stored locally on the selected client computing device and provide the local update to the one or more server computing devices.

For example, in some implementations, determining the local update can include training the machine-learned model based at least in part on the local dataset to generate a locally-trained model. In some implementations, the machine-learned model can be trained via stochastic gradient descent. For example, each selected client computing device can perform some number of mini-batch stochastic gradient descent steps to generate the locally-trained model, such as updated local values for the global set of parameters for the machine-learned model.

In some implementations, determining the local update can include determining a difference between the locally-trained model and the machine-learned model. For example, in some implementations, the difference between the locally-trained model and the machine-learned model can be determined by determining a difference between the global set of parameters for the machine-learned model provided by the one or more server computing devices and the updated local values for the global set of parameters determined by training the machine-learned model with the local dataset.

In some implementations, determining the local update can further include clipping the difference to generate the local update. For example, the influence of any one client computing device on an updated machine-learned model parameter can be limited by clipping the difference to have a bounded $L_2$ norm.

In some implementations, clipping can include performing flat clipping. For example, for a single-layer model, the difference (such as a single vector) can be clipped based on an overall clipping parameter S such that the local update has norm at most S. For a multiple-layer model, the concatenation of all the layers can be clipped such that the local update has norm at most S.

In some implementations, clipping can include performing per-layer clipping. For example, for a multiple-layer model, given a per-layer clipping parameter $S_j$, each layer j can be clipped such that the layer j has norm at most $S_j$. Per-layer clipping may be preferable for multiple-layer models wherein different layers (such as vectors at each layer) have different $L_2$ norms. The local update can be determined by clipping each layer j using the per-layer clipping parameter $S_j$.

Each client computing device can then provide the local update to the one or more server computing devices. For example, in some implementations, the local update can be clipped before being provided to the one or more server computing devices, as described herein. In various implementations, the local update can be provided as one or more vectors, matrices, parameters, or other formats, and may be encoded before being provided to the one or more server computing devices.

The one or more server computing devices can then receive the local updates from the selected client computing devices, and determine a differentially private aggregate of the local updates. For example, in some implementations, a bounded-sensitivity data-weighted average of the local updates can be determined. As used herein, the bounded-sensitivity data weighted-average can be a mean average, a median average, a moving-window average, or other form of average.

For example, in some implementations, the bounded-sensitivity data-weighted average of the local updates can be determined based at least in part on an expected weight parameter. For example, obtaining updates from a random-sized subset of client computing devices for each round of optimization can produce a variable-sized sample C. The expected weight of the sample C can then be used to determine the average of the local updates. In some implementations, the expected weight of C can be denoted as qW, where q is a probability parameter used to select the client computing devices and W is the total sum of the weights of the local updates. Stated differently, the expected weight parameter can be, for example, the expected weight of the expected number of users (client computing devices) sampled per round based on a probability parameter used to independently select the users (client computing devices).

In some implementations, determining the bounded-sensitivity data-weighted average of the local updates can include estimating the bounded-sensitivity data-weighted average by an unbiased estimator. For example, the unbiased estimator can estimate the bounded-sensitivity data-weighted average by dividing a weighted sum of the local updates by a selection probability parameter q times the sum of all weights W associated with the pool of available client computing devices.

In some implementations, determining the bounded-sensitivity data-weighted average of the local updates can include estimating the bounded-sensitivity data-weighted average by a biased estimator. For example, the biased estimator can estimate the bounded-sensitivity data-weighted average by dividing the weighted sum of the local updates by a maximum of: a selection probability parameter q times a lower bound weight $W_{min}$; or a sum of all weights associated with the selected client computing devices.

In some implementations, determining the bounded-sensitivity data-weighted average of the local updates can include enforcing a bound on a computed average of the local updates. For example, the bound can be determined by multiplying the computed average of the local updates by a minimum of one or a bound value S divided by the computed average.

The one or more server computing devices can then determine the updated machine-learned model based at least in part on the bounded-sensitivity data-weighted average of the local updates.

In some implementations, determining the updated machine-learned model based at least in part on the bounded-sensitivity data-weighted average of the local updates can include adding a noise component to the bounded-sensitivity data-weighted average of the local updates. For example, in some implementations, the noise component can be a Gaussian noise component, which can be scaled to the sensitivity of the data-weighted average of the local updates.

In some implementations, the one or more server computing devices can determine a privacy guarantee parameter based at least in part on the bounded-sensitivity data-weighted average of the local updates. The privacy guarantee parameter can be used, for example, to evaluate the differential privacy of the updated machine-learned model. In some implementations, the privacy guarantee parameter can be provided with the updated machine-learned model to users of the machine-learned model.

In some implementations, the machine-learned model can be a neural network such as, for example, a recurrent neural network. For example, the recurrent neural network can be a long short-term (LSTM) recurrent neural network (RNN) model. For example, in some implementations, the machine-learned model can be an LSTM RNN tuned for language modeling in a mobile keyboard. The LSTM RNN can be used, for example, to predict the next word in a sequence from one or more preceding words. In other implementations, the machine-learned model can be other types of machine-learned models, and can be used for various purposes.

The systems and methods described herein may provide a number of technical effects and benefits. For example, the systems and methods provided herein allow for machine-learned models to be trained with user-level differential privacy guarantees. Moreover, such training can be accomplished without sacrificing model accuracy. For example, a machine-learned model can be trained, such as via a federated learning framework, while protecting an individual user's data and/or identity from potential adversaries.

In turn, by providing user-level differential privacy, the systems and methods of the present disclosure can allow for machine-learned models to be trained using user data which best reflects the actual use of the model, rather than proxy data which may produce an inferior model. For example, a machine-learned model configured for next-word prediction in a mobile device keyboard can be trained using actual user datasets stored locally on the users' devices. This, in turn, can allow for increased accuracy of a machine-learned model as compared to training via proxy data.

The systems and methods of the present disclosure also provide an improvement to computing technology, such as in a federated learning framework. In particular, a computing system (e.g., one or more server computing devices and/or one or more client computing devices) can select a subset of client computing devices from a pool of available computing devices. In some implementations, each selected client computing device can be independently selected from the pool based at least in part on a probability parameter. The computing system can further provide a machine-learned model to the selected client computing devices. The computing system can receive a local update for the machine-learned model from the selected client computing devices. The local update can be determined, for example, by training the machine-learned model using a local dataset stored on the selected client computing device to generate a locally-trained model. In some implementations, the local update can be a clipped difference between the locally-trained model and the machine-learned model. The computing system can determine a bounded-sensitivity data-weighted average of the local updates. In some implementations, the computing system can determine the bounded-sensitivity data-weighted average of the local updates based at least in part on an expected weight parameter. In some implementations, the bounded-sensitivity data-weighted average of the local updates can be determined by a biased or an unbiased estimator. The computing system can determine an updated machine-learned model based at least in part on the bounded-sensitivity data-weighted average of the local updates. In some implementations, the computing system can determine the updated machine-learned model by adding a noise component to the bounded-sensitivity data-weighted average of the local updates.

2. Example Discussion of User-Level Differentially Private Model Training 2.1 Introduction to Example Concepts Machine-learned models, such as deep recurrent models like long short-term memory (LSTM) recurrent neural networks (RNNs), have become a standard building block in modern approaches to language modeling, with applications in speech recognition, input decoding for mobile keyboards, and language translation. Because language usage can vary widely by problem domain and dataset, training a language model on data from the right distribution can be important. For example, a model to aid typing on a mobile keyboard may be better served by training data typed in mobile apps rather than from scanned books or transcribed utterances. However, language data can be uniquely privacy sensitive. For example, in some implementations, such as text typed on a user's computing device (e.g., mobile phone), sensitive information can include passwords, text messages, search queries, or other privacy sensitive information. In some instances, language data may identify an individual user, such as explicitly by name or implicitly, for example via a rare or unique phrase, and may be able to link that individual to secret or sensitive information.

Thus, in some implementations, it may be preferable for a language model's parameters to encode patterns of language use common to many users without memorizing any individual user's unique input sequences. However, in some instances, machine-learned models, such as convolutional neural networks, have been shown to memorize arbitrary labelings of the training data, and anecdotally, recurrent language models also appear to be capable of memorizing unique patterns in the training data. Further, attacks on machine-learned models have underscored the implicit risk. Example aspects of the present disclosure are thus directed towards providing a strong guarantee that the trained model can protect the privacy of individuals' data without undue sacrifice in model quality.

One example application of the present disclosure is directed towards an example of training a machine-learned model for next-word prediction in a mobile keyboard. This example is well suited to the techniques introduced herein, as differential privacy may allow for training on data from the true distribution (such as actual mobile usage) rather than on proxy data from some other source that would produce inferior models. However, one of ordinary skill in the art will recognize that the systems and methods of the present disclosure can be applied to a variety of machine-learned models and applications.

Additional aspects of the present disclosure are directed towards applying differential privacy to model training using the notion of user-adjacent datasets, leading to formal guarantees of user-level privacy, rather than privacy for single examples.

Additional aspects of the present disclosure are directed towards example algorithms which include a noised version of the federated averaging algorithm, which satisfies user-adjacent differential privacy via use of the moments accountant first developed to analyze differentially private stochastic gradient descent (SGD) for example-level privacy. (see Abadi, et al. Deep Learning with differential privacy. $23^{rd}$ ACM Conference on Computer and Communications Security (ACM CCS), 2016). The example federated averaging approach can group multiple SGD updates together, enabling large-step model updates.

2.1.1 Example Definitions for Differential Privacy

Differential privacy (DP) can provide a well-tested formalization for the release of information derived from private data. Applied to machine learning, a differentially private training mechanism can allow the public release of model parameters with a strong guarantee: adversaries can be severely limited in what they can learn about the original training data based on analyzing the parameters, even when they have access to arbitrary side information.

Definition 1: Differential Privacy: A randomized mechanism $\mathcal{M}: \mathcal{D} \rightarrow \mathcal{R}$ with a domain $\mathcal{D}$ (e.g., possible training datasets) and range $\mathcal{R}$ (e.g., all possible trained models) satisfies ($\varepsilon$, $\delta$)-differential privacy if for any two adjacent datasets d, d'$\in \mathcal{D}$ and for any subset of outputs S$\subseteq \mathcal{R}$ it holds that Pr[$\mathcal{M}$ (d)$\in$S]$\leq e^{\varepsilon}$Pr[$\mathcal{M}$ (d')$\in$S]+$\delta$.

Definition 1 leaves open the definition of adjacent datasets which may depend on the application. For example, in some implementations, differentially private machine learning may deal with example-level privacy: two datasets d and d' are defined to be adjacent if d' can be formed by adding or removing a single training example from d.

However, in some implementations, such as language modeling, protecting individual examples may be insufficient to protect an individual user's data and/or identity. For example, each typed word can make an individual contribution to a machine-learned model's training objective, so one user may contribute many thousands of examples to the training data. Further, a sensitive word or phrase may be typed several times by an individual user, but nonetheless should still be protected. The systems and methods of the present disclosure therefore apply the definition of differential privacy to the user-level, protecting whole user histories in the training set. This user-level privacy is ensured by using an appropriate adjacency relationship, defined in Definition 2.

Definition 2: User-adjacent datasets: Let d and d' be two datasets of training examples, where each example is associated with a user. Then, d and d' are adjacent if d' can be formed by adding or removing all of the examples associated with a single user from d.

Thus, model training that satisfies differential privacy with respect to datasets that are user-adjacent can satisfy an intuitive notion of privacy for language modeling: the presence or absence of any specific user's data in the training set has an imperceptible impact on the (distribution over) the parameters of the learned model. Thus, an adversary looking at the trained model cannot infer whether any specific user's data was used in the training, irrespective of what auxiliary information they may have. In particular, differential privacy can allow for ruling out the memorization of sensitive information in a strong information theoretic sense.

2.2 Example Algorithms for User-Level Differentially Private Training

Example algorithms provided by the present disclosure are based on or can otherwise be used in combination with Federated Averaging (or FedAvg) for federated learning. For example, in federated learning, a shared model can be trained while leaving the training data on each user's client computing device (e.g., mobile device). For example, devices can download the current model and compute an update by performing local computation on a local dataset. In some implementations, it may be worthwhile to perform extra computation on each user's data to minimize the number of communication rounds required to train a model, such as when the client computing device is subject to limited bandwidth. However, the example algorithms provided herein can be used in other applications and/or other model training frameworks. For example, using the FedAvg algorithm may be of interest even in a datacenter application when differential privacy is applied: larger updates may be more resistant to noise, and fewer rounds of training can imply less privacy cost. Further, the example algorithms provided herein can determine per-user updates based on a single user's data, and these updates can then be averaged to compute the final update applied to the shared model on each round. The example algorithms of the present disclosure can thus be extended to provide a user-level differential privacy guarantee.

Further, the example algorithms of the present disclosure can also be applied to or otherwise used in combination with the Federated SGD (FedSGD) algorithm. For example, the FedSGD algorithm can be essentially large-batch SGD where each minibatch is composed of "microbatches" that include data from a single distinct user. In some datacenter applications, FedSGD might be preferable to FedAvg, since fast networks may make it more practical to run more iterations. However, those additional iterations may come at a privacy cost. Further, the privacy benefits of federated learning can be nicely complementary to those of differential privacy, and FedAvg can be applied in the datacenter as well, so example aspects of the present disclosure are directed towards the FedAvg algorithm, but extend to the FedSGD and/or other suitable algorithms as well.

In some implementations, example modifications can be used to achieve differential privacy. For example, in some implementations, random-sized batches can be used, wherein client computing devices (e.g., user devices) can be selected independently with probability q, rather than always selecting a fixed number of users. In some implementations, clipping of per-user updates can be enforced so the total update has bounded $L_2$ norm. In some implementations, different estimators can be used to determine an average update. Further, in some implementations, Gaussian noise can be added to the final average update.

Example pseudocode according to example aspects of the present disclosure for differentially private FedAvg and FedSGD algorithms is provided in section 2.2.1. In section 2.2.2, example estimators are introduced, and in section 2.2.3, example clipping strategies are introduced, which together can allow the sensitivity of each rounds' update to any one user's data to be bounded. Further, the example sampling and example noise addition aspects of the present disclosure can allow for the moments accountant described herein to bound the total privacy loss of example algorithms of the present disclosure, as detailed in section 2.2.4. Finally, in section 2.2.5, properties of the moments accountant for training on large datasets are evaluated.

2.2.1 Example Training Loop Pseudocode

Example pseudocode training loops for modified FedAvg and FedSGD algorithms are provided below, with only the user updated function (UserUpdate FedAvg or UserUpdate FedSGD) differing between the two example training loops. The example pseudocode calls to the moments accountant $\mathcal{M}$ referenced herein. In some implementations, the example user update functions can be parameterized by a clipping strategy and corresponding parameters, either FlatClip or PerLayerClip. In some implementations, both clipping strategies can use a local learning rate $\eta$ and batch size $\mathcal{B}$. In some implementations, $\mathcal{B}$ can be set much larger for the example FedSGD algorithms.

Main Training Loop:
parameters
user selection probability $q \in (0,1]$
per-user example cap $\hat{w} \in \mathbb{R}^+$
noise scale $z \in \mathbb{R}^+$
estimator $\tilde{f}_f$ or $\tilde{f}_c$ with param $W_{min}$
UserUpdate (for FedAvg or FedSGD)
ClipFn (FlatClip or PerLayerClip)
Initialize model $\theta^0$
Initialize moments accountant $\mathcal{M}$
$n_k$=(number of examples for user k)

$$w_k = \min\left(\frac{n_k}{\hat{w}}, 1\right)$$

for all users k
$W = \sum_{k \in d} w_k$ for each round t=0, 1, 2, . . . do
$\mathcal{C}^t \leftarrow$(sample users with probability q)
for each user $k \in \mathcal{C}^t$ in parallel do
$\Delta_k^{t+1}$ UserUpdate(k, $\theta^t$, ClipFn)

$$\Delta^{t+1} = \begin{cases} \frac{\sum_{k \in \mathcal{C}^t} w_k \Delta_k}{qW} & \text{for } \tilde{f}_f \\ \frac{\sum_{k \in \mathcal{C}^t} w_k \Delta_k}{\max(qW_{min}, \sum_{k \in \mathcal{C}^t} w_k)} & \text{for } \tilde{f}_c \end{cases}$$

S←(bound on $\|\Delta_k\|$ for ClipFn)

$$\sigma \leftarrow \left\{\frac{zS}{qW} \text{ for } \tilde{f}_f \text{ or } \frac{2zS}{qW_{min}} \text{ for } \tilde{f}_c\right\}$$

$\tilde{\Delta}^{t+1} = \Delta^{t+1} + \mathcal{N}(0, I\sigma^2)$ $\theta^{t+1} \leftarrow \theta^t + \tilde{\Delta}^{t+1}$ $\mathcal{M}$ .accum_priv_spending(z)
print $\mathcal{M}$ .get_privacy_spent( )
FlatClip($\Delta$):
parameter S
return $\pi(\Delta, S)$ //See Eq. 4
PerLayerClip($\Delta$):
parameters $S_1, \ldots S_m$ $S = \sqrt{\Sigma_j S_j^2}$ for each layer $j \in \{1, \ldots, m\}$ do $\Delta'(j) = \pi(\Delta(j), S_j)$ return $\Delta'$
UserUpdateFedAvg(k, $\theta^0$, ClipFn):
parameters B, E, $\eta$
$\theta \leftarrow \theta^0$
$\mathcal{B} \leftarrow$ (k's data split into size B batches)
for each local epoch i from 1 to E do
for batch $b \in \mathcal{B}$ do $\theta \leftarrow \theta - \eta \nabla \ell (\theta; b)$ $\theta \leftarrow \theta^0 + \text{ClipFn}(\theta - \theta^0)$ return update $\Delta_k = \theta - \theta^0$ //Already clipped
UserUpdateFedSGD(k, $\theta^0$, ClipFn):
parameters B, $\eta$
select a batch b of size B from k's examples
return update $\Delta_k = \text{ClipFn}(-\eta \nabla \ell (\theta; b))$

2.2.2 Example Bounded-Sensitivity Estimators for Weighted Average Queries

In some implementations, example estimators of the present disclosure can be used to determine the bounded-sensitivity data-weighted average of the local updates. For example, randomly sampling users (or training examples) by selecting each independently with probability q can allow for proving low privacy loss through the use of the moments accountant $\mathcal{M}$. However, this can produce variable-sized samples $\mathcal{C}$, and when the quantity to be estimated is an average rather than a sum (as in computing the weighted average update in FedAvg or the average loss on a minibatch in SGD with example-level differential privacy), the variable-size of the sample may have ramifications for the sensitivity of the query.

In some implementations, estimators can be used to determine the weighted averages to which the moments accountant $\mathcal{M}$ can be applied. For example, d can be a weighted database where each row $k \in d$ is associated with a particular user and has an associated weight $w_k \in [0,1]$. The weight can capture the desired influence of the row on the final outcome. For example, row k can contain $n_k$ different training examples all generated by user k, with weight $w_k$ proportional to $n_k$. In a federated learning framework, a weighted model update $\Sigma_{k \in d} w_k \Delta(d_k, \theta) / \Sigma_{k \in d} w_k$ can be applied, where $\Delta(d_k, \theta)$ is the model update determined using data $d_k$ from the user k (with the notation abused slightly by also writing d for the set of users in the database). More generally, the database query can be expressed as:

$$f(d) = \frac{\Sigma_{k \in d} w_k \Delta_k}{\Sigma_{k \in d} w_k} \quad (1)$$

where $\Delta_k$ is some vector depending on $d_k$.

In some implementations, to reduce the computation and/or privacy cost, the weighted average can be estimated by sampling a small number of users. For example, in a uniform sampling approach, each row can be sampled independently with probability q, which allows a tight bound to be maintained on privacy loss. Let $\mathcal{C}$ denote such a sample. Let $W = \Sigma_{k \in d} w_k$ denote the total sum of the weights. f(d) can then be approximated using $\mathcal{C}$. For example, an unbiased estimator can be:

$$\tilde{f}_f(\mathcal{C}) = \frac{\Sigma_{k \in \mathcal{C}} w_k \Delta_k}{qW} \quad (2)$$

Since qW is the expected weight of $\mathcal{C}$.

In some implementations, a biased estimator can be used. For example, a biased estimator can be $$\tilde{f}_*(\mathcal{C}) = \frac{\Sigma_{k \in \mathcal{C}} w_k \Delta_k}{\Sigma_{k \in \mathcal{C}} w_k},$$

which may have a lower variance when only a small number of users are sampled. In order to control the sensitivity of $\tilde{f}_*$, the denominator can include a lower bound (with parameter $W_{min}$) as:

$$\tilde{f}_c(\mathcal{C}) = \frac{\Sigma_{k \in \mathcal{C}} w_k \Delta_k}{\max(qW_{min}, \Sigma_{k \in \mathcal{C}} w_k)} \quad (3)$$

In some implementations in which the updates $\Delta_k$ are highly correlated, $\tilde{f}_*$ may provide a better estimate than $\tilde{f}_f$.

In some implementations, the sensitivity of an estimator f may need to be controlled, defined as $\mathbb{S}(f) = \max_k \|f(\mathcal{C} \cup \{k\}) - f(\mathcal{C})\|$, where the added user k can have arbitrary data. In some implementations, the sensitivity of the estimator can be limited by clipping each summand in the estimator to have bounded $L_2$ norm. For example, for given bound S>0, a clipping projection which can be applied can be:

$$\pi(\Delta, S) \stackrel{def}{=} \Delta \cdot \min\left(1, \frac{S}{\|\Delta\|}\right) \quad (4)$$

In some implementations, clipping may lead to additional bias. In some implementations, a clipping parameter can be chosen to be large enough that nearly all updates are smaller than the clip value. However, a larger S may require more noise in order to achieve privacy, which may slow training. Thus, S can be treated as a hyper-parameter and can be tuned. Clipping strategies are considered in greater detail in section 2.2.3. Assuming that clipping has been applied to each update, in some implementations, the sensitivity of (2) and (3) can be bounded:

Lemma 1 If for all users k we have $\|w_k\Delta_k\|_2 \leq S$, then the sensitivity of the two estimators is bounded as $$\mathbb{S}(\tilde{f}_f) \leq \frac{S}{qW} \text{ and } \mathbb{S}(\tilde{f}_c) \leq \frac{2S}{qW_{min}}.$$

Proof.

For the first bound, observe the numerator in the estimator $\tilde{f}_f$ can change by at most S between neighboring databases, by assumption. The denominator is a constant. For the second bound, the estimator $\tilde{f}_c$ can be thought of as the sum of the vectors $w_k\Delta_k$ divided by $\max(qW_{min}, \Sigma_{k \in \mathcal{C}} \Delta_k)$. Writing $\text{Num}(\mathcal{C})$ for the numerator $\Sigma_{k \in \mathcal{C}} w_k\Delta_k$, and $\text{Den}(\mathcal{C})$ for the denominator $\max(qW_{min}, \Sigma_{k \in \mathcal{C}} w_k)$, the following are immediate for any $\mathcal{C}$ and $\mathcal{C}' \triangleq \mathcal{C} \cup \{k\}$:

$\|\text{Num}(\mathcal{C}') - \text{Num}(\mathcal{C})\| = \|w_k\Delta_k\| \leq S$.

$\|\text{Den}(\mathcal{C}') - \text{Den}(\mathcal{C})\| \leq 1$.

$\|\text{Den}(\mathcal{C}')\| \geq qW_{min}$.

It follows that $$\|\tilde{f}_c(\mathcal{C}') - \tilde{f}_c(\mathcal{C})\| = \left\|\frac{\text{Num}(\mathcal{C}')}{\text{Den}(\mathcal{C}')} - \frac{\text{Num}(\mathcal{C})}{\text{Den}(\mathcal{C})}\right\|$$

$$= \left\|\frac{\text{Num}(\mathcal{C}') - \text{Num}(\mathcal{C})}{\text{Den}(\mathcal{C}')} + \text{Num}(\mathcal{C})\left(\frac{1}{\text{Den}(\mathcal{C}')} - \frac{1}{\text{Den}(\mathcal{C})}\right)\right\|$$

$$\leq \left\|\frac{w_k\Delta_k}{\text{Den}(\mathcal{C}')}\right\| + \left\|\frac{\text{Num}(\mathcal{C})}{\text{Den}(\mathcal{C})}\left(\frac{\text{Den}(\mathcal{C}) - \text{Den}(\mathcal{C}')}{\text{Den}(\mathcal{C}')}\right)\right\|$$

$$\leq \frac{S}{qW_{min}} + \|\tilde{f}_c(\mathcal{C})\|\left(\frac{1}{qW_{min}}\right)$$

$$\leq \frac{2S}{qW_{min}}.$$

$\|\tilde{f}_c(\mathcal{C})\| \leq S$. Thus, the claim follows.

2.2.3 Example Clipping Strategies for Multi-Layer Models

In some implementations, for sensitivity to be controlled, Lemma 1 only requires that $\|w_k\Delta_k\|$ be bounded. In some implementations, clipping may be applied only to updates $\Delta_k$, with $w_k \leq 1$. For example, for a model with a single parameter vector, $\Delta'_k = \pi(\Delta_k, S)$.

However, in some implementations, such as for multi-layer models, the parameters of each layer can be treated as a separate vector. For example, in some implementations, the updates to each layer could have a different $L_2$ norm, so it may be preferable to clip each layer separately.

In some implementations, flat clipping or per-layer clipping strategies can be performed. Formally, let each update $\Delta_k$ contain m vectors $\Delta_k = (\Delta_k(1), \ldots, \Delta_k(m))$. The following clipping strategies can ensure the total update has norm at most S:

Flat clipping: In some implementations, a plurality of layers can be concatenated, and the concatenation can be clipped. For example, given an overall clipping parameter S, the concatenation of all the layers can be clipped as $\Delta'_k = \pi(\Delta_k, S)$.

Per-layer clipping: In some implementations, each layer can be clipped according to a clipping parameter. For example, given a per-layer clipping parameter $S_j$ for each layer, set $\Delta_k(j) = \pi(\Delta_k(j), S_j)$. Let $S = \sqrt{\Sigma_{j=1}^m S_j^2}$. In some implementations, a model-independent choice is to use $$S_j = \frac{S}{\sqrt{m}}$$

for all j.

2.2.4 Example Privacy Guarantees

In some implementations, a privacy guarantee parameter can be determined. For example, in some implementations, once the sensitivity of a chosen example estimator is bounded, noise can be added to obtain a privacy guarantee. For example, in some implementations, Gaussian noise scaled to this sensitivity can be added. For example, in some implementations, an $(\varepsilon, \delta)$-differential privacy bound can be used for the Gaussian mechanism, and the privacy amplification lemma and the advanced composition theorem can be applied to get a bound on the total privacy cost. In some implementations, a moments accountant $\mathcal{M}$ can be used to achieve privacy bounds. For example, the moments accountant for the sampled Gaussian mechanism can upper bound the total privacy cost of T steps of the Gaussian mechanism with noise $N(0, \sigma^2)$ for $\sigma = z \cdot \mathbb{S}$, where z is a parameter, $\mathbb{S}$ is the sensitivity of the query, and each row is selected with probability q. Given a $\delta > 0$, the moments accountant can give an $\varepsilon$ for which this mechanism satisfies $(\varepsilon, \delta)$-differential privacy.

Theorem 1

For the example estimators $(\tilde{f}_f, \tilde{f}_c)$, the moments accountant of the sampled Gaussian mechanism correctly computes the privacy loss with the noise scale of $z = \sigma/\mathbb{S}$ and steps T, where $\mathbb{S} = S/qW$ for $(\tilde{f}_f)$ and $2S/qW_{min}$ for $(\tilde{f}_c)$.

Proof.

It suffices to verify that 1) the moments (of the privacy loss) at each step are correctly bounded; and, 2) the composability holds when accumulating the moments of multiple steps.

At each step, users can be selected randomly with probability q. If in addition the $L_2$-norm of each user's update is upper-bounded by $\mathbb{S}$, then the moments can be upper-bounded by that of the sampled Gaussian mechanism with sensitivity 1, noise scale $\sigma/\mathbb{S}$, and sampling probability q.

The example algorithms of the present disclosure can use a fixed noise variance and can generate the independent and identically distributed (i.i.d.) noise independent of the private data. Thus, the composability as in Theorem 2.1 in Abadi, et al., Deep Learning with differential privacy. 23rd ACM Conference on Computer and Communications Security (ACM CCS), 2016, can be applied.

The theorem can thus be obtained by combining the above and the sensitivity bounds $\tilde{f}_f$ and $\tilde{f}_c$.

2.2.5 Example Differential Privacy for Large Datasets

In some implementations, increasing the dataset size can allow for high levels of privacy to be obtained more easily. For example, the moments accountant can make strong use of amplification via sampling. Table 1 summarizes privacy guarantees as certain parameters are varied.

TABLE 1

| users | sample | noise | Upper bound on privacy ε after 1, 10, ..., $10^6$ rounds | | | | | | |
|---|---|---|---|---|---|---|---|---|---|
| K | $\tilde{C}$ | z | $10^0$ | $10^1$ | $10^2$ | $10^3$ | $10^4$ | $10^5$ | $10^6$ |
| $10^5$ | $10^2$ | 1.0 | 0.97 | 0.98 | 1.00 | 1.07 | 1.18 | 2.21 | 7.50 |
| $10^6$ | $10^1$ | 1.0 | 0.68 | 0.69 | 0.69 | 0.69 | 0.69 | 0.72 | 0.73 |
| $10^6$ | $10^3$ | 1.0 | 1.17 | 1.17 | 1.20 | 1.28 | 1.39 | 2.44 | 8.13 |
| $10^6$ | $10^4$ | 1.0 | 1.73 | 1.92 | 2.08 | 3.06 | 8.49 | 32.38 | 187.01 |
| $10^6$ | $10^3$ | 3.0 | 0.47 | 0.47 | 0.48 | 0.48 | 0.49 | 0.67 | 1.95 |
| $10^9$ | $10^3$ | 1.0 | 0.84 | 0.84 | 0.84 | 0.85 | 0.88 | 0.88 | 0.88 |

Table 1 shows the privacy for different total numbers of users K (all with equal weight), expected number of users sampled per round $\tilde{C}$, and the number of rounds of training, where for each row, $$\delta = \frac{1}{K^{1.1}}$$

is set and the value of ε for which (ε, δ)-differential privacy holds after 1 to $10^6$ rounds is reported. Thus, for large datasets, additional rounds of training incur only a minimal additional privacy loss.

Therefore, in implementations in which the cost in utility of adding noise proportional to z times the sensitivity of the updates can be afforded, reasonable privacy guarantees over a large range of parameters can be obtained. In some implementations, the size of the dataset can have a modest impact on the privacy cost of a single query (1 round column), but a large effect on the number of queries that can be run without significantly increasing the privacy cost (compare the $10^6$ round column). For example, on a dataset with $10^9$ users, the privacy upper bound is nearly constant between 1 and $10^6$ calls to the mechanism (that is, rounds of the optimization algorithm).

Further, in some implementations, there may only be a small cost in privacy for increasing the expected number of (equally weighted) users $\tilde{C}$=qW selected on each round as long as $\tilde{C}$ remains a small fraction of the size of the total dataset. Since the sensitivity of an average query decreases like $1/\tilde{C}$ (and hence the amount of noise needed to be added decreases proportionally), $\tilde{C}$ can be varied (e.g., increased) to select a noise level that does not adversely affect the optimization process.

Example models using example algorithms of the present disclosure have been empirically evaluated on a realistic dataset, and demonstrated that user-level differentially private training of a machine-learned model is possible at a negligible loss in utility, instead paying a cost in additional computation. Such private training, particularly in a federated learning framework, shows the possibility of training models with significant privacy guarantees for important applications.

For example, a high quality LSTM language model trained with strong privacy guarantees according to example aspects of the present disclosure has been demonstrated to exhibit no significant decrease in model accuracy given a large enough dataset. For example, on a dataset of 763,430 users, baseline (non-private) training achieved an accuracy of 17.5% in 4120 rounds of training, where the data from 100 random users were used on each round. An example model according to example aspects of the present disclosure achieved the same level of accuracy with $(4.6, 10^{-9})$-differential privacy in 4980 rounds, processing on average 5000 users per round, maintaining the same level of accuracy at an increased computational cost of roughly sixty times. In some implementations, the computational cost may be mitigated by training on a public dataset rather than starting from a random initialization. For example, running the same computation on a larger dataset with $10^8$ users would improve the privacy guarantee to $(1.2, 10^{-9})$. For example, privacy can be guaranteed and utility maintained despite the complex internal structure of the model—with per-word embeddings as well as dense state transitions—by using the example algorithms of the present disclosure. Further, the metrics and qualitative behavior (with respect to head words) of the noised model according to example aspects of the present disclosure did not differ significantly from the non-private model. Moreover, in some implementations, parameters can be tuned for training complex models with differential privacy guarantees.

3. Example Systems

FIG. 1 depicts an example system 100 for training one or more machine learning models 106 using respective training data 108 stored locally on a plurality of client computing devices 102 (i.e., a local dataset). In some implementations, system 100 can include one or more server computing devices 104. The one or more server computing device(s) 104 can be configured to access machine-learned model 106, and to provide model 106 to a plurality of client computing devices 102. Model 106 can be, for instance, a linear regression model, logistic regression model, a support vector machine model, a neural network (e.g. convolutional neural network, recurrent neural network, etc.), or other suitable model. In some implementations, the one or more server computing device(s) 104 can be configured to communicate with client computing devices 102 over one or more networks.

Client computing devices 102 can each be configured to determine one or more local updates associated with model 106 based at least in part on training data 108. For instance, training data 108 can be data that is respectively stored locally on the client devices 102. The training data 108 can include audio files, image files, video files, a typing history, location history, and/or various other suitable data. In some implementations, the training data 108 can be any data derived through a user interaction with a client computing device 102.

Further to the descriptions above, a user may be provided with controls allowing the user to make an election as to both if and when systems, programs or features described herein may enable collection, storage, and/or use of user information (e.g., training data 108), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although training data 108 is illustrated in FIG. 1 as a single database, the training data 108 consists of data that is respectively stored at each client computing device 102. Thus, in some implementations, the training data 108 is highly unbalanced and not independent and identically distributed.

Client computing devices 102 can be configured to provide the local updates to the one or more server computing devices 104. As indicated above, training data 108 may be privacy sensitive. In this manner, the local updates can be performed and provided to server 104 without compromising the privacy of training data 108. For instance, in some implementations, training data 108 is not provided to the one or more server computing devices 104. Further, in some implementations, the local update does not include training data 108. In some implementations, one or more of encryption techniques and/or other security techniques can be added to the training process to assist in obscuring any inferable information. In some implementations, the local update can be clipped by the client computing device 102 before being provided to the one or more server computing devices 104, as disclosed herein.

As indicated above, the one or more server computing devices 104 can receive each local update from client device 102, and can determine differentially private aggregate of the local updates. For example, in some implementations, a bounded-sensitivity data-weighted average of the local updates can be determined. Further, the one or more server computing devices 104 can determine an updated machine-learned model based at least in part on the differentially private aggregate of the local updates.

Figure 2:
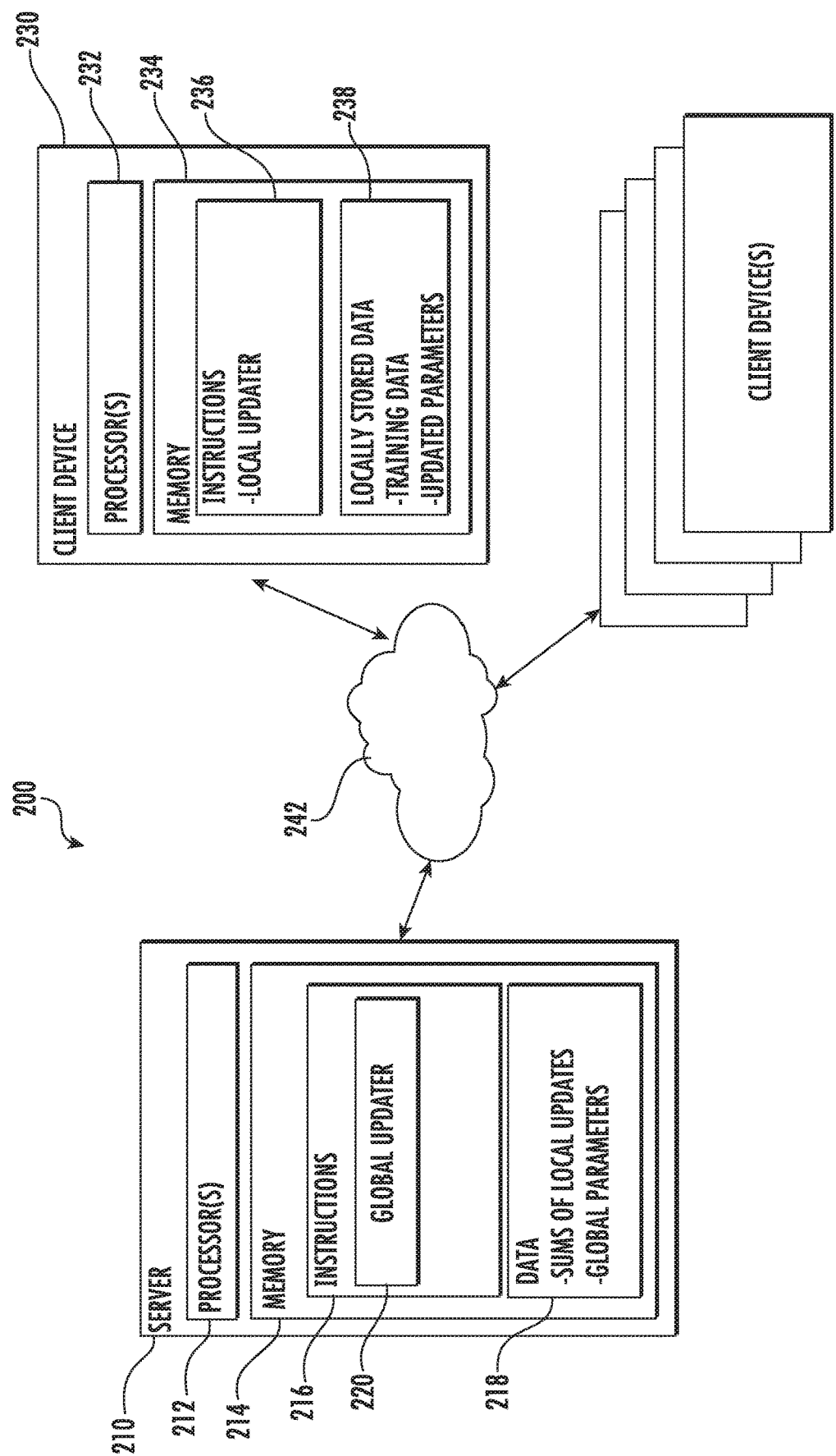
FIG. 2 depicts a block diagram of an example computing system according to example aspects of the present disclosure.

FIG. 2 depicts an example computing system 200 that can be used to implement the methods and systems of the present disclosure. The system 200 can be implemented using a client-server architecture that includes a server 210 (e.g., one or more server computing devices) that communicates with one or more client devices 230 (e.g., client computing devices) over a network 242. Thus, FIG. 2 provides an example system 200 that can implement the scheme illustrated by system 100 of FIG. 1.

The system 200 includes a server 210, such as a web server. The server 210 can be implemented using any suitable computing device(s). The server 210 can have one or more processors 212 and one or more memory devices 214. The server 210 can be implemented using one server device or a plurality of server devices. In implementations in which a plurality of devices are used, such plurality of devices can operate according to a parallel computing architecture, a sequential computing architecture, or a combination thereof.

The server 210 can also include a network interface used to communicate with one or more client devices 230 over the network 242. The network interface can include any suitable components for interfacing with one more networks, including for example, transmitters, receivers, ports, controllers, antennas, or other suitable components.

The one or more processors 212 can include any suitable processing device, such as a microprocessor, microcontroller, integrated circuit, logic device, or other suitable processing device. The one or more memory devices 214 can include one or more computer-readable media, including, but not limited to, non-transitory computer-readable media, RAM, ROM, hard drives, flash drives, or other memory devices. The one or more memory devices 214 can store information accessible by the one or more processors 212, including computer-readable instructions 216 that can be executed by the one or more processors 212.

The instructions 216 can be any set of instructions that when executed by the one or more processors 212, cause the one or more processors 212 to perform operations. For example, the instructions 216 can be executed by the one or more processors 212 to implement a global updater 220. The global updater 220 can be configured to receive one or more local updates and to determine an updated machine-learned model based at least in part on the local updates.

As shown in FIG. 2, the one or more memory devices 214 can also store data 218 that can be retrieved, manipulated, created, or stored by the one or more processors 212. The data 218 can include, for instance, local updates (and/or sums thereof), global parameters, and other data. For example, the sum of local updates for a particular round of training can be stored temporarily until an updated machine-learned model is determined. The data 218 can be stored in one or more databases. The one or more databases can be connected to the server 210 by a high bandwidth LAN or WAN, or can also be connected to server 210 through network 242. The one or more databases can be split up so that they are located in multiple locales.

The server 210 can exchange data with one or more client devices 230 over the network 242. Any number of client devices 230 can be connected to the server 210 over the network 242. Each of the client devices 230 can be any suitable type of computing device, such as a general purpose computer, special purpose computer, laptop, desktop, mobile device, navigation system, smartphone, tablet, wearable computing device, gaming console, a display with one or more processors, or other suitable computing device.

Similar to the server 210, a client device 230 can include one or more processor(s) 232 and a memory 234. The one or more processor(s) 232 can include, for example, one or more central processing units (CPUs), graphics processing units (GPUs) dedicated to efficiently rendering images or performing other specialized calculations, and/or other processing devices. The memory 234 can include one or more computer-readable media and can store information accessible by the one or more processors 232, including instructions 236 that can be executed by the one or more processors 232 and data 238.

The instructions 236 can include instructions for implementing a local updater configured to determine one or more local updates according to example aspects of the present disclosure. For example, the local updater can perform one or more training techniques such as, for example, backwards propagation of errors, stochastic gradient descent, or other training technique to re-train or otherwise update the model based on the locally stored training data. The local updater can be configured to perform structured updates, sketched updates, or other techniques. The local updater can be included in an application or can be included in the operating system of the device 230.

The data 238 can include one or more training data examples to be used in solving one or more optimization problems. The training data examples of each client device 230 can be distributed unevenly among the client devices, such that no client device 230 includes a representative sample of the overall distribution of the training data examples.

The data 238 can further include updated parameters to be communicated to the server 210. For example, in some implementations, a client device 230 can receive a machine-learned model (such as a set of global parameters) from the server 210, train the machine-learned model based at least in part on the local dataset to generate a locally-trained model (such as updated local values for the global set of parameters for the machine-learned model), determine a difference between the machine-learned model and the locally-trained model (such as a difference between the global parameters and the updated local values), and clip the difference to generate the local update. In some implementations, the local update can be expressed in a vector, a matrix, or other suitable format.

The client device 230 of FIG. 2 can include various input/output devices for providing and receiving information from a user, such as a touch screen, touch pad, data entry keys, speakers, and/or a microphone suitable for voice recognition.

The client device 230 can also include a network interface used to communicate with one or more remote computing devices (e.g. server 210) over the network 242. The network interface can include any suitable components for interfacing with one more networks, including for example, transmitters, receivers, ports, controllers, antennas, or other suitable components.

The network 242 can be any type of communications network, such as a local area network (e.g. intranet), wide area network (e.g. Internet), cellular network, or some combination thereof. The network 242 can also include a direct connection between a client device 230 and the server 210. In general, communication between the server 210 and a client device 230 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

4. Example Methods

Figure 3:
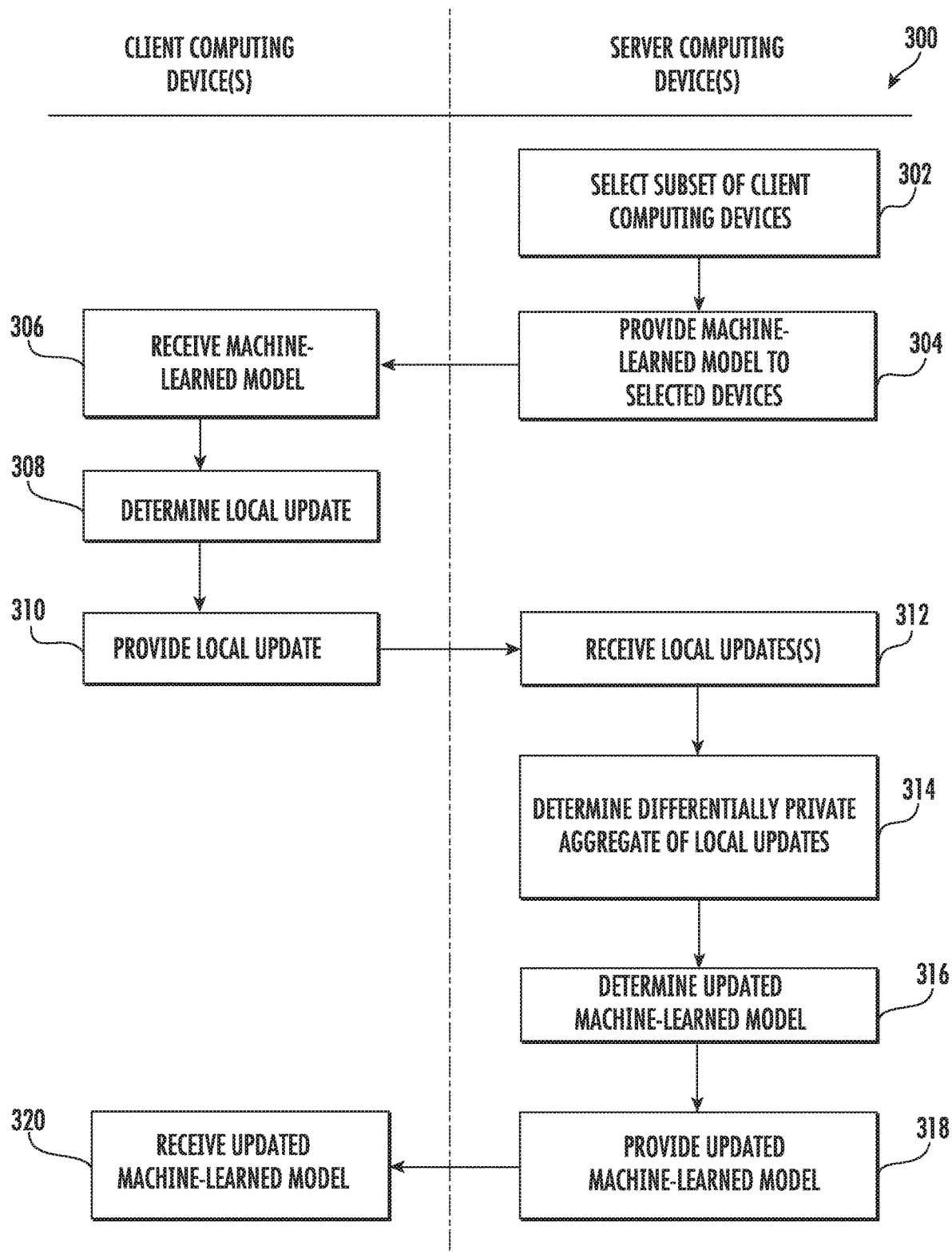
FIG. 3 depicts a flow chart diagram of an example method for differentially private machine learning according to example aspects of the present disclosure.

FIG. 3 depicts a flow diagram of an example method (300) for differentially private machine learning according to example aspects of the present disclosure. Method (300) can be implemented by one or more computing devices, such as one or more of the computing devices depicted in FIGS. 1 and/or 2. In addition, FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (302), the method (300) can include selecting, by one or more server computing devices, a subset of client computing devices from a pool of available client computing devices. For example, in some implementations, the pool of available client computing devices can include a plurality of client computing devices that are powered on, plugged into a power source, and/or in an idle mode. In some implementations, each client computing device can be independently selected from the pool based at least in part on a probability parameter q.

At (304), the method (300) can include providing, by the one or more server computing devices, the machine-learned model to the selected client computing devices, and at (306), the method (300) can include receiving, by the selected client computing devices, the machine-learned model. In some implementations, the machine-learned model can be, for example, a global set of parameters.

At (308), the method (300) can include determining, by each selected client computing device, a local update based at least in part on a local dataset stored locally on the selected client computing device. For example, in some implementations, each selected client computing device can train the machine-learned model based at least in part on the local dataset to determine a locally-trained model. For example, in some implementations, the client computing device can train the machine-learned model via stochastic gradient descent. In some implementations, the local update can be determined by each selected client computing device by first determining a difference between the locally-trained model and the machine-and learned model. For example, the difference can be a difference between a set of global parameters and updated local values for the global set of parameters for the machine-learned model. In some implementations, the local update can be determined by clipping the difference between the locally-trained model and the machine-learned model. For example, in some implementations, a selected client computing device can perform flat clipping or per-layer clipping to generate the local update.

At (310), the method (300) can include providing, by each selected client computing device, the local update to the one or more server computing devices, and at (312), the method (300) can include receiving, by the one or more server computing devices, the local updates. In some implementations, the local updates can be, for example, expressed in one or more matrices, vectors, or other suitable format.

At (314), the method (300) can include determining a differentially private aggregate of the local updates. For example, in some implementations, the differentially private aggregate can be a bounded-sensitivity data-weighted average of the local updates can be determined. In some implementations, the bounded-sensitivity data-weighted average of the local updates can be determined based at least in part on an expected weight parameter.

In some implementations, the one or more server computing devices can determine the bounded-sensitivity data-weighted average of the local updates by estimating the bounded-sensitivity data-weighted average by an unbiased estimator. For example, an unbiased estimator can use a weighted sum of the local updates divided by a selection probability parameter times a sum of all weights associated with the pool of available client computing devices, as disclosed herein.

In some implementations, the one or more server computing devices can determine the bounded-sensitivity data-weighted average of the local updates by estimating the bounded-sensitivity data-weighted average by a biased estimator. For example, a biased estimator can use a weighted sum of the local updates divided by a maximum of: a selection probability parameter times a lower bound weight; or a sum of all weights associated with the selected client computing devices.

In some implementations, determining the bounded-sensitivity data-weighted average of the local updates can include enforcing a bound on a computed average of the local updates. For example, the bound can include multiplying the computed average by a minimum of: one; or a bound value divided by the computed average.

At (316), the method (300) can include determining an updated machine-learned model based at least in part on the bounded-sensitivity data-weighted average of the local updates. For example, in some implementations, the bounded-sensitivity data-weighted average of the local updates can be added to the machine-learned model to determine the updated machine-learned model. In some implementations, a noise component can be added to the bounded-sensitivity data-weighted average of the local updates to determine the updated model. In some implementations, the noise component can be a Gaussian noise component scaled to the sensitivity of the weighted average.

At (318), the method (300) can include providing, by the one or more server computing devices, the updated machine-learned model to one or more client computing devices, and at (320), the method (300) can include receiving, by the one or more client computing devices, the updated machine-learned model. For example, the updated machine-learned model can be a global model provided to the pool of available client computing devices.

Any number of iterations of local and global updates can be performed. That is, method (300) can be performed iteratively to update the machine-learned model based on locally stored training data over time.

Figure 4:
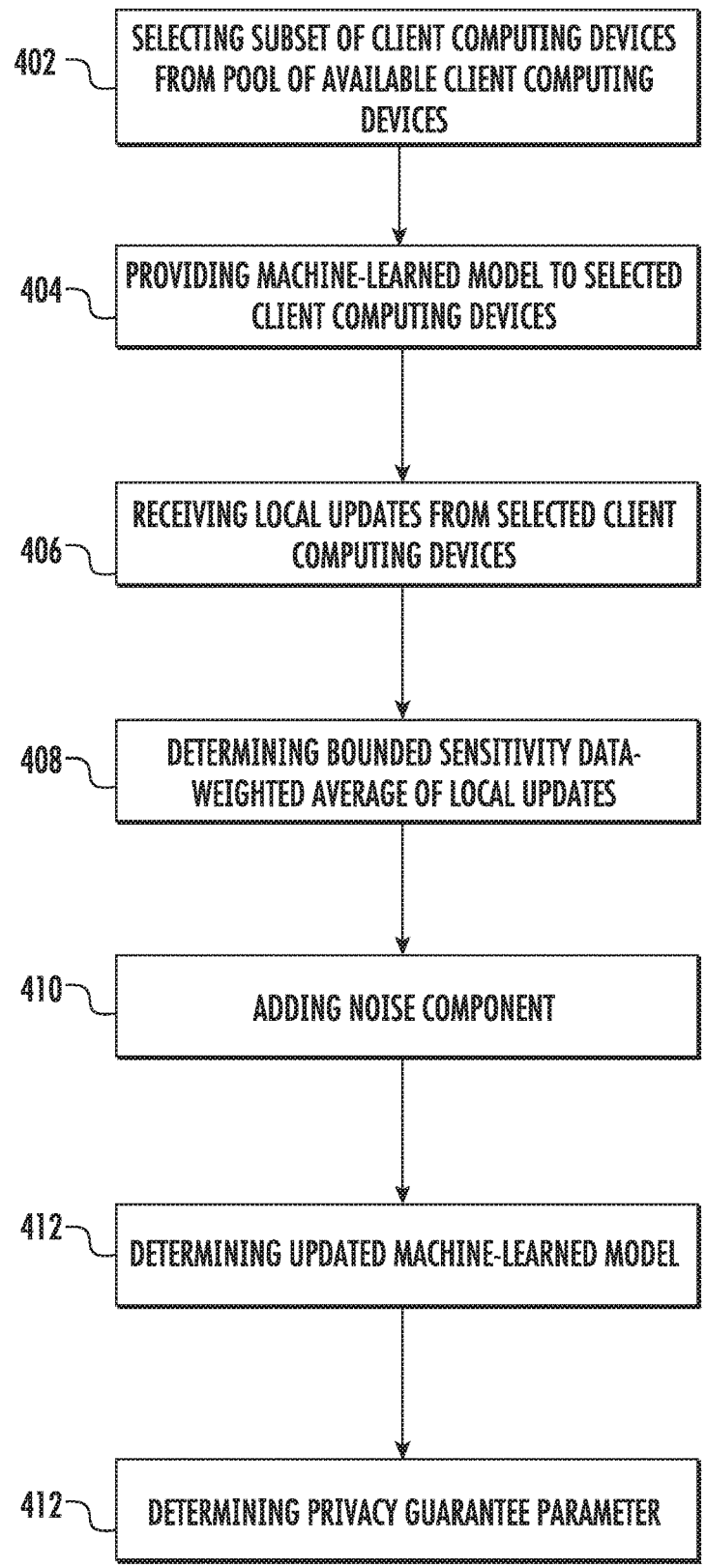
FIG. 4 depicts a flow chart diagram of an example method for differentially private machine learning according to example aspects of the present disclosure.

FIG. 4 depicts a flow diagram of an example method (400) for differentially private machine learning according to example aspects of the present disclosure. Method (400) can be implemented by one or more server computing devices, such as one or more server computing devices depicted in FIGS. 1 and/or 2. In addition, FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. The one or more server computing devices can include one or more processors and one or more non-transitory computer readable media.

At (402), the method (400) can include selecting, by the one or more server computing devices, a subset of client computing devices from a pool of available client computing devices. For example, in some implementations, the pool of available client computing devices can include a plurality of client computing devices that are powered on, plugged into a power source, and/or in an idle mode. In some implementations, each client computing device can be independently selected from the pool based at least in part on a probability parameter q.

At (404), the method (400) can include providing, by the one or more server computing devices, the machine-learned model to the selected client computing devices. For example, the one or more server computing devices can communicate the machine-learned model to the selected client computing devices via a network.

At (406) the method (400) can include receiving, from each selected client computing device, a local update for the machine-learned model. In some implementations, each local update can be determined based at least in part on a local dataset stored locally on the selected client computing device. For example, in some implementations, each selected client computing device can train the machine-learned model baseless in part on the local dataset to determine a locally-trained model. In some implementations, the local updates can be clipped, as described herein, prior to being received by the one or more server computing devices.

At (408), the method (400) can include determining a bounded-sensitivity data-weighted average of the local updates. In some implementations, the bounded-sensitivity data-weighted average of the local updates can be determined based at least in part on an expected weight parameter.

In some implementations, the one or more server computing devices can determine the bounded-sensitivity data-weighted average of the local updates by estimating the bounded-sensitivity data-weighted average by an unbiased estimator. For example, an unbiased estimator can use a weighted sum of the local updates divided by a selection probability parameter times a sum of all weights associated with the pool of available client computing devices, as disclosed herein.

In some implementations, the one or more server computing devices can determine the bounded-sensitivity data-weighted average of the local updates by estimating the bounded-sensitivity data-weighted average by a biased estimator. For example, a biased estimator can use a weighted sum of the local updates divided by a maximum of: a selection probability parameter times a lower bound weight; or a sum of all weights associated with the selected client computing devices.

In some implementations, determining the bounded-sensitivity data-weighted average of the local updates can include enforcing a bound on a computed average of the local updates. For example, the bound can include multiplying the computed average by a minimum of: one; or a bound value divided by the computed average.

At (410), the method (400) can include adding a noise component to the bounded-sensitivity data-weighted average of the local updates. For example, in some implementations, the noise component can be a Gaussian noise component scaled to the sensitivity of the weighted average.

At (412), the method (400) can include determining an updated machine-learned model based at least in part on the bounded-sensitivity data-weighted average of the local updates. For example, in some implementations, the bounded-sensitivity data-weighted average of the local updates can be added to the machine-learned model to determine the updated machine-learned model. In some implementations, the updated machine-learned model can be the bounded-sensitivity data-weighted average of the local updates plus the noise component, plus the machine-learned model.

At (414), the method (400) can include determining a privacy guarantee parameter based at least in part on the bounded-sensitivity data-weighted average of the local updates. In some implementations the privacy guarantee parameter can be used to evaluate the differential privacy of the updated machine-learned model. In some implementations, the privacy guarantee parameter can be provided with the updated machine-learned model to users of the machine-learned model.

Any number of iterations of updates can be performed. That is, method (400) can be performed iteratively to update the machine-learned model based on locally stored training data over time.

Figure 5:
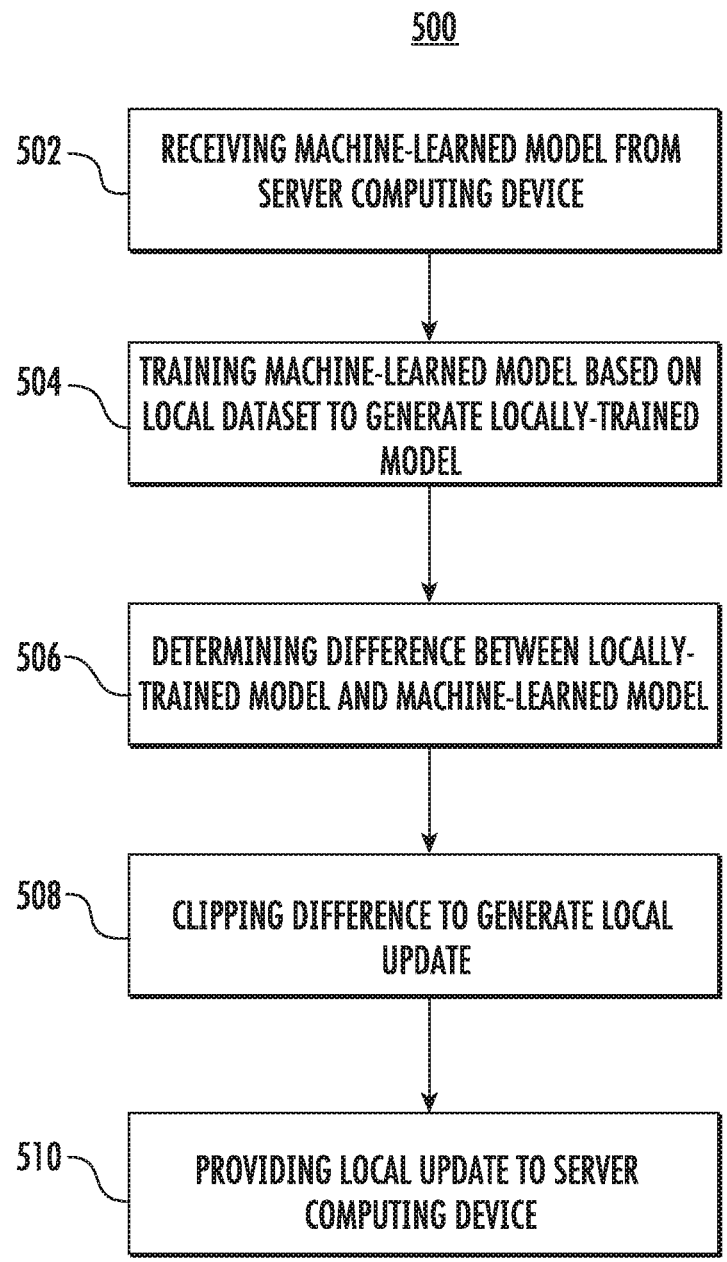
FIG. 5 depicts a flow chart diagram of an example method for determining a local update on a client computing device according to example aspects of the present disclosure.

FIG. 5 depicts a flow diagram of an example method (500) for determining a local update according to example aspects of the present disclosure. Method (500) can be implemented by one or more client computing devices, such as one or more client computing devices depicted in FIGS. 1 and/or 2. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. The one or more client computing devices can include one or more processors and one or more non-transitory computer readable media.

At (502), the method (500) can include receiving, by a selected client computing devices, the machine-learned model from one or more server computing devices. In some implementations, the machine-learned model can be, for example, a global set of parameters.

At (504), the method (500) can include training a machine-learned model by the client computing devices based at least in part on a local dataset to generate a locally-trained model. For example, in some implementations, the client computing device can train the machine-learned model via stochastic gradient descent.

At (506), the method (500) can include determining a difference between the locally-trained model and the machine-learned model. For example, in some implementations, the difference between the locally-trained model and the machine-learned model can be determined by determining a difference between the global set of parameters for the machine-learned model provided by the one or more server computing devices and the updated local values for the global set of parameters determined by training the machine-learned model with the local dataset.

At (508), the method (500) can include clipping the difference to generate a local update. For example, the influence of any one client computing device on an updated machine-learned model parameter can be limited by clipping the difference to have a bounded $L_2$ norm. In some implementations, clipping can include performing flat clipping or per-layer clipping, as disclosed herein.

At (510), the method (500) can include providing, by the client computing device, the local update to the one or more server computing devices. For example, the client computing device can communicate the local update to one or more server computing devices via a network.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more server computing devices, the one or more server computing devices comprising one or more processors and one or more non-transitory computer-readable media that collectively store instructions that, when executed by the one or more processors cause the one or more server computing devices to perform operations, the operations comprising:
selecting a subset of client computing devices from a pool of available client computing devices;
providing a machine-learned model to the selected client computing devices;
receiving, from each selected client computing device, a local update for the machine-learned model;
determining a differentially private aggregate of the local updates, wherein the differentially private aggregate satisfies a first differential privacy metric such that a sensitivity of the aggregate to data from any one client is bounded;
determining an updated machine-learned model based at least in part on the differentially private aggregate of the local updates; and
transmitting, through a network interface, one or more model parameters of the updated machine-learned model to one or more of the available client computing devices, wherein the transmitted one or more model parameters satisfy a second differential privacy metric such that a sensitivity of the transmitted one or more model parameters to the data from any one client is bounded.

2. The computing system of claim 1, wherein selecting the subset of client computing devices from the pool of available client computing devices comprises selecting each selected client computing device independently from the pool based at least in part on a probability parameter.

3. The computing system of claim 1, wherein determining the differentially private aggregate of the local updates comprises determining a bounded-sensitivity data-weighted average of the local updates; and
wherein determining the updated machine-learned model based at least in part on the differentially private aggregate of the local updates comprises determining the updated machine-learned model based at least in part on the bounded-sensitivity differentially private average of the local updates.

4. The computing system of claim 3, wherein determining the bounded-sensitivity data-weighted average of the local updates comprises estimating the bounded-sensitivity data-weighted average by an unbiased estimator that comprises a weighted sum of the local updates divided by a selection probability parameter times a sum of all weights associated with the pool of available client computing devices.

5. The computing system of claim 3, wherein determining the bounded-sensitivity data-weighted average of the local updates comprises estimating the bounded-sensitivity data-weighted average by a biased estimator that comprises a weighted sum of the local updates divided by a maximum of:
a selection probability parameter times a lower bound weight; or
a sum of all weights associated with the selected client computing devices.

6. The computing system of claim 3, wherein determining the bounded-sensitivity data-weighted average of the local updates comprises enforcing a bound on a computed average of the local updates;
   wherein the bound comprises multiplying the computed average by a minimum of:
      one; or
      a bound value divided by the computed average.

7. The computing system of claim 3, wherein determining the updated machine-learned model comprises adding a noise component to the bounded-sensitivity data-weighted average of the local updates.

8. The computing system of claim 1, further comprising:
   the one or more selected client computing devices, each selected client computing device comprising one or more processors and one or more non-transitory computer-readable media that store instructions that, when executed by the one or more processors cause the client computing device to perform operations, the operations comprising:
      receiving, from the one or more server computing devices, the machine-learned model;
      determining the local update based at least in part on a local dataset stored locally on the selected client computing device; and
      providing the local update to the one or more server computing devices.

9. The computing system of claim 8, wherein determining the local update based at least in part on the local dataset comprises:
   training the machine-learned model based at least in part on the local dataset to generate a locally-trained model.

10. The computing system of claim 9, wherein determining the local update based at least in part on the local dataset comprises:
   determining a difference between the locally-trained model and the machine-learned model; and
   clipping the difference to generate the local update.

11. The computing system of claim 10, wherein clipping the difference to generate the local update comprises performing flat clipping.

12. The computing system of claim 10, wherein clipping the difference to generate the local update comprises performing per-layer clipping.

13. The computing system of claim 9, wherein training the machine-learned model comprises training the machine-learned model via stochastic gradient descent.

14. The computing system of claim 1, wherein the operations further comprise:
   determining a privacy guarantee parameter based at least in part on the differentially private aggregate of the local updates.

15. A computer-implemented method for differentially private machine learning, comprising:
   selecting, by one or more server computing devices, a subset of client computing devices from a pool of available client computing devices;
   providing, by the one or more server computing devices to the selected client computing devices, a machine-learned model;
   determining, by each selected client computing device, a local update based at least in part on a local dataset;
   providing, by each selected client computing device, the local update to the one or more server computing devices;
   determining, by the one or more server devices, a bounded-sensitivity data-weighted average of the local updates;
   determining, by the one or more server computing devices, an updated machine-learned model based at least in part on the bounded-sensitivity data-weighted average of the local updates; and
   transmitting, by the one or more server computing devices and through a network interface, one or more model parameters of the updated machine-learned model to one or more of the available client computing devices, wherein the transmitted one or more model parameters satisfy a differential privacy metric such that a sensitivity of the transmitted one or more model parameters to the data from any one client is bounded.

16. The computer-implemented method of claim 15, wherein selecting, by the one or more server computing devices, the subset of client computing devices from the pool of available client computing devices comprises selecting, by the one or more server computing devices, each selected client computing device independently from the pool based at least in part on a probability parameter.

17. The computer-implemented method of claim 15, wherein determining, by the one or more server computing devices, the updated machine-learned model based at least in part on the bounded-sensitivity data-weighted average of the local updates comprises determining, by the one or more server computing devices, the bounded-sensitivity data-weighted average of the local updates based at least in part on an expected weight parameter.

18. The computer-implemented method of claim 15, wherein determining, by the one or more server computing devices, the updated machine-learned model based at least in part on the bounded-sensitivity data-weighted average of the local updates comprises adding a noise component to the bounded-sensitivity data-weighted average of the local updates.

19. The computer-implemented method of claim 15, wherein determining, by each selected client computing device, the local update based at least in part on the local dataset comprises:
   training the machine-learned model based at least in part on the local dataset to generate a locally-trained model;
   determining a difference between the locally trained model and the machine-learned model; and
   clipping the difference to generate the local update.

20. One or more server computing devices, the one or more server computing devices configured to perform operations, the operations comprising:
   selecting a subset of client computing devices from a pool of available client computing devices;
   providing a machine-learned model to the selected client computing devices;
   receiving, from each selected client computing device, a local update for the machine-learned model;
   determining an updated machine-learned model based at least in part on the local updates, wherein the updated machine-learned model is subject to a user-adjacent differential privacy guarantee that a sensitivity of the updated machine-learned model to data from any one client is bounded; and
   transmitting, through a network interface, one or more model parameters of the updated machine-learned model to one or more of the available client computing devices, wherein the transmitted one or more model parameters satisfy a differential privacy metric such that a sensitivity of the transmitted one or more model parameters to the data from any one client is bounded.

* * * * *